UNITED STATES PATENT OFFICE.

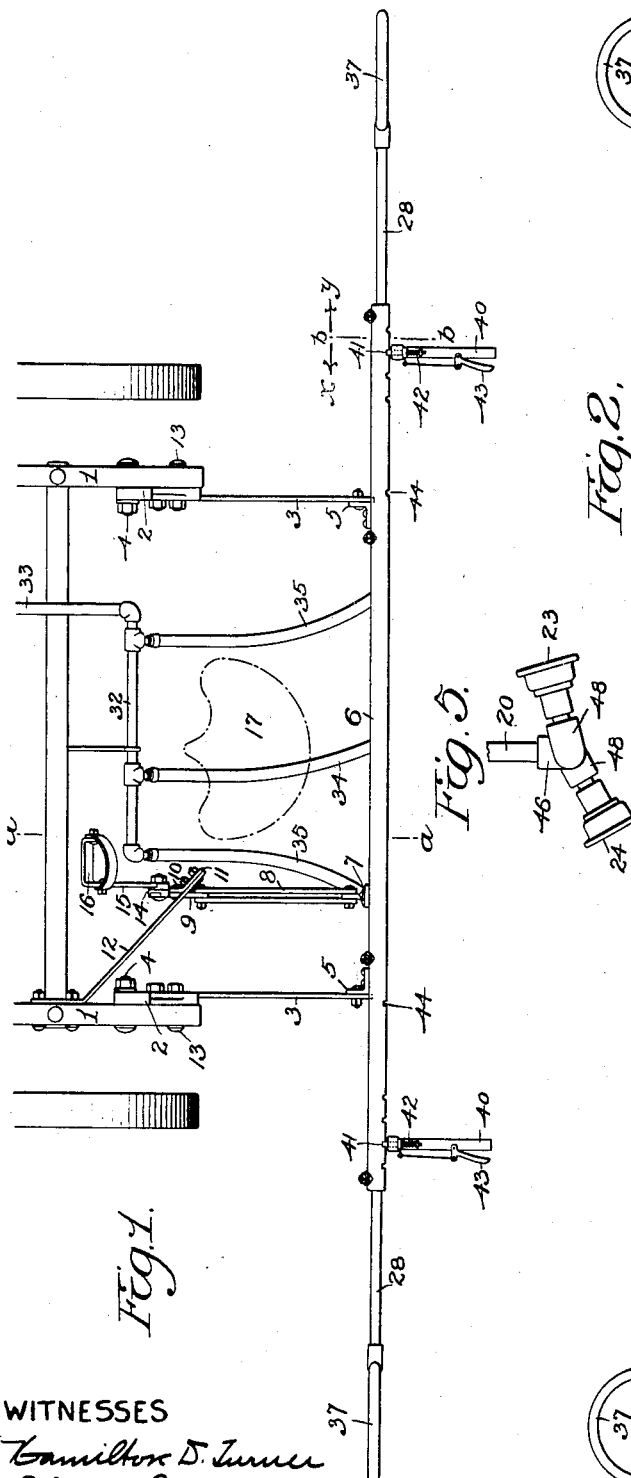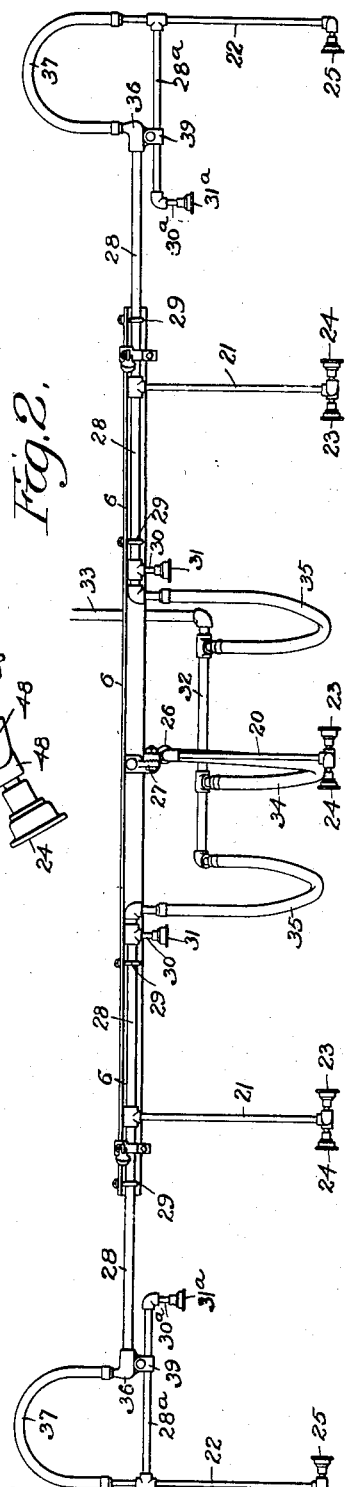

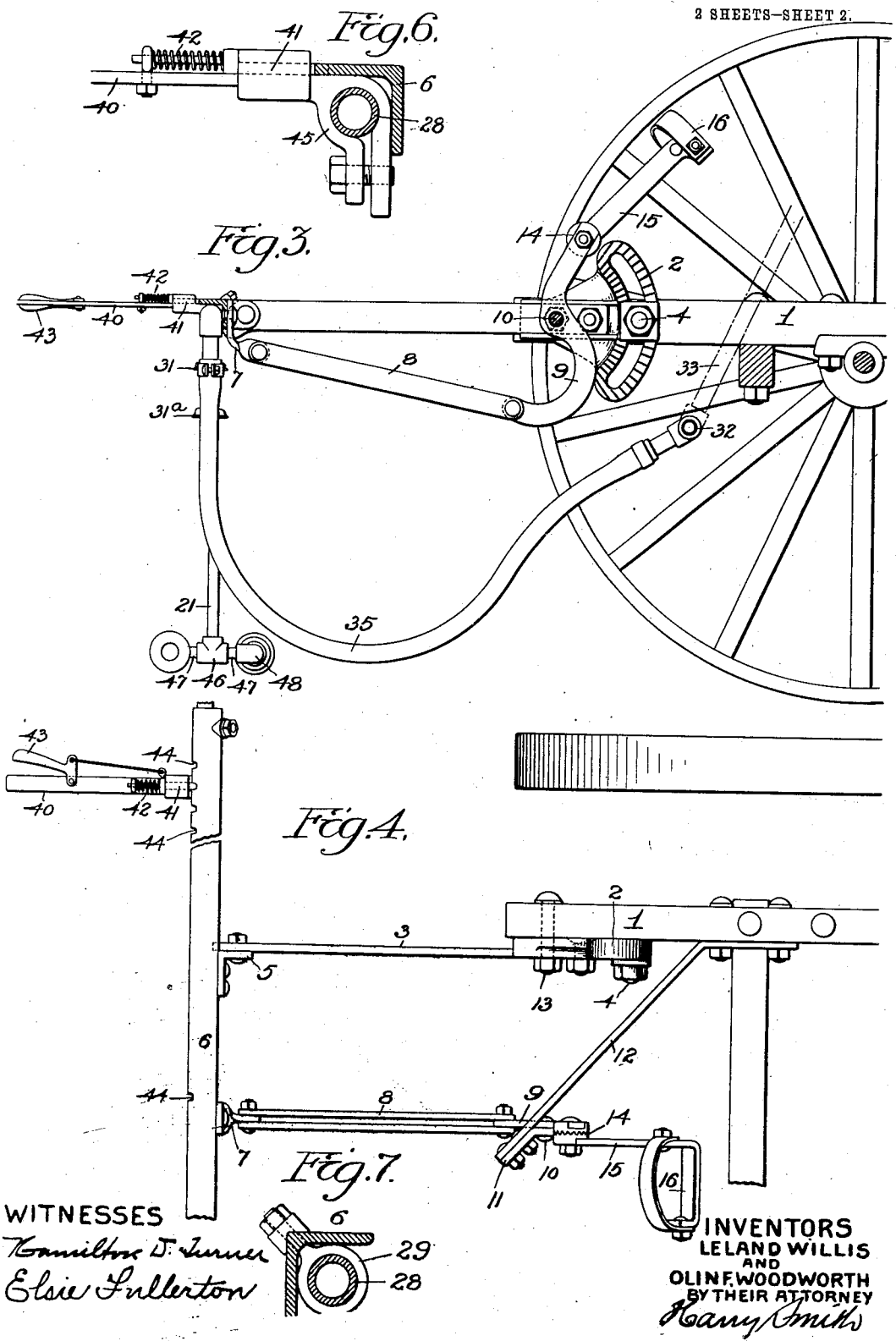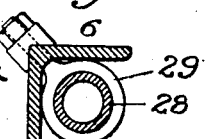

LELAND WILLIS AND OLIN F. WOODWORTH, OF GRENLOCH, NEW JERSEY, ASSIGNORS TO BATEMAN MANUFACTURING COMPANY, OF GRENLOCH, NEW JERSEY, A CORPORATION OF NEW JERSEY.

MULTIPLE-ROW PLANT-SPRAYING MACHINE.

1,118,091.  Specification of Letters Patent.  Patented Nov. 24, 1914.

Application filed July 18, 1913. Serial No. 779,799.

*To all whom it may concern:*

Be it known that we, LELAND WILLIS and OLIN F. WOODWORTH, both citizens of the United States, residing in Grenloch, New Jersey, have invented certain Improvements in Multiple-Row Plant-Spraying Machines, of which the following is a specification.

Our invention relates to a plant spraying device intended for simultaneously spraying the plants of four separate rows, the invention comprising certain constructions and combinations of parts whereby the spraying devices are permitted to rise when they meet with obstructions, can be readily adjusted laterally in respect to one another so as to accord with the varying widths at which the rows of plants may be set apart from one another, can be raised or lowered to accord with the height of the plants at the time the spraying operation is being performed and can be so set as to vary the direction in which the spray is delivered from the spraying nozzles.

In the accompanying drawings—Figure 1 is a plan view of the spraying devices, the bar carrying the same, the means for supporting and adjusting said bar, and the means for laterally adjusting the spraying devices on said bar; Fig. 2 is a front elevation of the spraying devices and the supporting bar therefor; Fig. 3 is a longitudinal section on the line $a$—$a$, Fig. 1; Fig. 4 is a plan view of one end of the bar which carries the spraying mechanism, of the devices for supporting and adjusting said bar, and of the means for adjusting one of the sets of spraying devices on said bar and locking it in position after adjustment; Fig. 5 is a front view of a pair of spraying nozzles and of the means for supporting the same so as to provide for adjustment of said spraying nozzles at different angles of inclination in respect to the horizontal; Fig. 6 is a longitudinal section on the line $b$—$b$, Fig. 1, looking in the direction of the arrow $x$, and Fig. 7 is a longitudinal section on the same line but looking in the direction of the arrow $y$. Figs. 3, 4, and 5 are on a larger scale than Figs. 1 and 2, and Figs. 6 and 7 are on a still larger scale.

The spraying devices are mounted upon a wheeled frame having rearwardly projecting side beams 1, upon each of which is pivotally mounted a slotted quadrant 2, to which is rigidly secured a rearwardly projecting arm 3, the slotted quadrant being secured in any desired position of angular adjustment in respect to the beam 1 by means of a suitable nut and washer applied to a clamping bolt 4 carried by said side bar 1, and passing through the slot of the quadrant.

Pivotally mounted upon the opposite arms 3 by means of projecting ears 5 is a transverse bar 6 preferably of angular cross section, and this bar is also provided with another ear 7 which is connected by links 8 to a lever 9, the latter being pivoted, as by a pivot bolt 10, to an angular plate 11 mounted upon the inner end of a diagonal bar 12 secured to and projecting inwardly from the side frame 1, as shown in Figs. 1 and 4, the axis of the pivot bolt 10 being coincident with that of the pivot bolt 13 whereby the quadrant 2 is pivoted to the side frame which carries the bar 12.

Mounted upon the upper end of the lever 9, by means of an adjustable pivotal joint 14, is an arm 15, provided at its upper end with a stirrup 16 for the reception of the left foot of the machine attendant, who occupies the seat 17, shown by dotted lines in Fig. 1. By means of the slotted quadrants, whereby the arms 3 are mounted upon the side frames 1 of the machine, the bar 6 can be raised and lowered to accord with the height of the plants which are being sprayed and by means of the lever 9 the said bar 6 can be swung upon its pivotal bearings so as to correspondingly swing the spraying devices mounted upon said bar and thus raise or lower said spraying devices to meet a temporary or local requirement, the coinciding axes of the pivot bolts 10 and 13 permitting rise and fall of the bar 6, without disturbing in any way the mechanism for effecting the swinging of the bar, or changing the position of the spraying devices in respect to said bar.

When the lever 9 has been moved so as to bring the pivoted connections between the said lever and the link 8, the pivotal connection between the latter and the ear 7, and the pivotal connections between the arms 3 and bar 6, into line with the lever pivot 10, the bar 6 will be locked in position and the spraying devices carried by said bar may be held in an elevated or inoperative position, as for instance, when driving the machine from place to place, between successive spraying operations. The pivotal connection below the lever 9 and the stirrup arm 15 permits such adjustment of the latter that the before mentioned swinging adjustment of the bar 6 can be effected before the stirrup contacts with any part of the fixed frame, which would arrest its further movement.

There are three sets of spraying devices, namely, a central set, fixedly mounted on the bar 6 in the sense of having no lateral movement thereon, and two side sets, one on the right hand side of the center of the bar 6 and the other on the left hand side of the same, the machine being designed to simultaneously spray the plants of four adjoining rows, and the right and left hand sets of spraying devices being adjustable laterally on the bar 6 so as to adapt them to the distance apart at which the rows may happen to be planted.

The central set of spraying devices has a single depending nozzle pipe 20 and each of the side sets has an inner depending nozzle pipe 21 and an outer depending nozzle pipe 22. Each of the nozzle pipes 20 and 21 has at its lower end a pair of laterally discharging nozzles 23 and 24, one of these nozzles projecting from the pipe in a right hand direction and the other in a left hand direction, as shown in Fig. 2. Each of the outer nozzle pipes 22 has a single nozzle 25, that of one pipe projecting to the right and that of the other pipe to the left, as also shown in Fig. 2. When the machine is in operation, therefore, the nozzles 23 and 24 of the pipe 20 will spray the inner or adjoining sides of the innermost rows of plants, the nozzles 23 on the pipes 21 will spray the outer sides of said inner rows, the nozzles 24 of the pipes 21 will spray the inner sides of the two outer rows, and the nozzles 25 of the pipes 22 will spray the outer sides of said outer rows.

The nozzle pipe 20 communicates at its upper end with a pipe 26 which is pivotally mounted upon an ear 27 on the bar 6 and each of the nozzle pipes 21 is secured to and communicates with a pipe 28 which is mounted in eye-bolts 29 on the bar 6, as shown in Fig. 7, so that it can be adjusted laterally in respect to said bar, the stems of the eye-bolts passing through the corner of the bar 6 so that said eye-bolts will be snugly confined in the angle of said bar.

Each of the pipes 28 has a short depending nozzle pipe 30 having at its lower end a downwardly discharging nozzle 31, these latter nozzles serving to spray the tops of the plants of the inner rows.

Some distance in advance of the bar 6 is a relatively short transverse pipe 32 which is connected by a pipe 33 to the pumping apparatus which supplies the spraying liquid, and said pipe 32 communicates, through a flexible connection 34, with the pipe 26 and through similar flexible connections 35 with the pipes 28, as shown in Fig. 2.

The outer end of each of the pipes 28 is in communication through a coupling 36 and flexible connection 37 with the upper end of the corresponding outer nozzle pipe 22 and each of said outer nozzle pipes communicates with a short nozzle pipe 30$^a$ through a horizontal pipe 28$^a$ which is free to slide laterally in a looped hanger 39 depending from the coupling 36 at the outer end of the corresponding pipe 28. Each of said nozzle pipes 30$^a$ carries a downwardly discharging top spraying nozzle 31$^a$, for spraying the top of one of the outer rows of plants.

In order to effect lateral adjustment of the pipes 28 on the bar 6 each of said pipes has a projecting arm 40 secured thereto as for instance by means of a clamp 45, as shown in Fig. 6. Suitably mounted and guided upon the arm 40 is a sliding bolt 41 which is normally moved forwardly by means of a spring 42 but can be retracted when desired by reason of its connection with a lever 43 pivotally mounted upon the arm 40, as shown in Figs. 1 and 4.

In the rear edge of the upper flange of the bar 6 are formed a series of notches 44 located at different distances from the center of said bar, so that when either of the pipes 28 has been moved by its arm 40 to the desired lateral position on the bar 6 it can be locked in such position by engagement of the bolt 41 with one or other of said notches 44.

The nozzles 23 and 24 are secured to the lower ends of the nozzle pipes 20 and 21 by means best shown in Figs. 3 and 5 and comprising a T-coupling 46 at the lower end of the pipe 20 or 21, the horizontal branches of this T-coupling each receiving a short pipe 47 which communicates, at its outer end, through an elbow 48, with the stem of the nozzle 23 or 24.

By turning the elbows 48 around the horizontal axes of the pipes 47, therefore, the nozzles 23 and 24 may be caused to project their sprays either horizontally, as shown in Fig. 2, upwardly, as shown at the right hand side of Fig. 5, or downwardly as shown at the left hand side of said figure, and by turning the T-coupling 46 around the vertical axis of the pipe 20 or 21 the nozzles may be caused to project their sprays either directly sidewise or with a forward or rearward slant, as may be desired.

The nozzles 25 may be connected to the pipes 22 in substantially the same manner except that in that case an elbow coupling can be used instead of the T-coupling 46.

Owing to the fact that the pivots whereby the ears 5 on the bar 6 are connected to the arms 3 are in the rear of said bar, the latter can swing upwardly whenever a nozzle strikes an obstruction which exerts an upward pressure thereupon, the bar swinging downwardly again as soon as the obstruction has been passed.

We claim:

1. The combination, in a plant spraying machine, of a fixed frame, arms hung thereto by pivots having horizontal axes, a transverse bar carrying spraying devices and hung to said arms by pivots having horizontal axes, a bar-swinging lever having a pivot with horizontal axis, and connections between said lever and the bar, the pivots of the bar-carrying arms and the pivot of the lever being laterally separated and independent of each other but having coincident axes whereby the bar can be raised or lowered without deranging the swinging devices therefor.

2. The combination, in a plant spraying device, of a fixed frame, arms pivotally mounted thereon and having pivotally mounted at their outer ends a transverse bar, spraying devices carried thereby, swinging devices for said bar having as elements a pivoted lever, and a stirrup-carrying arm having a pivotal mounting upon said lever, whereby its angular relation thereto can be changed, as desired.

3. The combination, in a plant spraying machine, of a bar of angular cross section having eye-bolts located in the angle of the bar and having stems passing through the corner of said bar, and spraying devices carried by a pipe which passes through said eye-bolts and is adjustable laterally therein.

4. The combination, in a plant spraying machine, of a transverse bar of angular cross section presenting a horizontal flange with notches in the rear edge thereof, a pipe carrying spraying devices and mounted in the angle of said bar so as to be laterally adjustable thereon, and an arm projecting rearwardly from said pipe and having a sliding bolt which is adapted to the notches in the rear edge of the horizontal flange of the bar.

5. The combination, in a plant spraying machine, of a pipe for supplying spraying liquid, said pipe having a coupling at its outer end, a pipe parallel with but below said first named pipe and adjustable laterally in respect thereto, said lower pipe having depending nozzle pipes at its opposite ends, the inner pipe being shorter than the outer pipe, a flexible connection between the coupling and the outer nozzle pipe, a downwardly discharging nozzle on the inner nozzle pipe, and a laterally discharging nozzle on the outer nozzle pipe.

In testimony whereof, we have signed our names to this specification, in the presence of two subscribing witnesses.

LELAND WILLIS.
OLIN F. WOODWORTH.

Witnesses:
H. R. GURLEY,
B. FRANKLIN CHASE.